Jan. 29, 1957 E. M. BRADBURD 2,779,933

COMPLEX PULSE COMMUNICATION SYSTEM

Filed March 29, 1950 6 Sheets-Sheet 1

INVENTOR
ERVIN M. BRADBURD
BY Percy P. Lantzy
ATTORNEY

Jan. 29, 1957 E. M. BRADBURD 2,779,933

COMPLEX PULSE COMMUNICATION SYSTEM

Filed March 29, 1950 6 Sheets-Sheet 2

INVENTOR
ERVIN M. BRADBURD
BY Percy P. Lantzy
ATTORNEY

Jan. 29, 1957 E. M. BRADBURD 2,779,933

COMPLEX PULSE COMMUNICATION SYSTEM

Filed March 29, 1950 6 Sheets-Sheet 3

INVENTOR
ERVIN M. BRADBURD
BY Percy P. Lantzy
ATTORNEY

Jan. 29, 1957

E. M. BRADBURD 2,779,933

COMPLEX PULSE COMMUNICATION SYSTEM

Filed March 29, 1950

6 Sheets-Sheet 4

INVENTOR
ERVIN M. BRADBURD

BY Percy P. Lantzy

ATTORNEY

Jan. 29, 1957 E. M. BRADBURD 2,779,933

COMPLEX PULSE COMMUNICATION SYSTEM

Filed March 29, 1950 6 Sheets-Sheet 5

INVENTOR
ERVIN M. BRADBURD
BY Percy P. Lantzy
ATTORNEY

INVENTOR
ERVIN M. BRADBURD
BY Lucy P. Lantz
ATTORNEY

United States Patent Office 2,779,933

Patented Jan. 29, 1957

2,779,933

COMPLEX PULSE COMMUNICATION SYSTEM

Ervin M. Bradburd, Fairlawn, N. J., assignor to International Telephone and Telegraph Corporation, a corporation of Maryland Application March 29, 1950, Serial No. 152,530

15 Claims. (Cl. 340—147)

This invention relates to communication systems and more particularly to communication systems wherein the information is transmitted by means of complex pulse groupings.

Various forms of pulse systems have been used for communicating intelligence as well as for measuring distances of reflecting or repeating objects. One of the simplest forms of pulse systems utilized in the past provides for a single series of pulses which may be transmitted with varying amplitude, varying time displacement or varying widths for the conveyance of intelligence. Such systems in general require synchronization since they principally work on the basis of a regular time repetition rate for the pulses of each train.

In addition to this type of pulse communication, pulse systems wherein code groupings are utilized have likewise been used. In this case, again it is generally necessary to provide some form of synchronization particularly if interference between two or more stations is likely to be encountered. Furthermore, in all prior art pulsing systems interference may cause false signalling information. The interference may be introduced by atmospheric conditions or by other stations.

It is an object of this invention to provide a system utilizing a complex series of pulses in which the pulse spacing between adjacent pulses of the group are different and may be varied while maintaining the ratio of spacing between adjacent pulses constant.

In order to reduce danger of response by equipment triggered on by pulses, various types of pulse groupings have been utilized. For example, if two pulses are used with a predetermined spacing it is less likely that an error will occur if the receiver is adjusted to respond only to such spaced pulses. This system may be extended by providing three or more pulses and a receiver which will recognise only the particular grouping of three or more pulses. However, in such systems no special regard with respect to the particular ratios of spacings have been made. Moreover, no system here-to-fore proposed has provided an arrangement wherein the spacings among three or more pulses are varied while the ration of these spacings is maintained constant. Accordingly, it is a feature of this invention to provide a communication system utilizing a plurality greater than two pulses in a group, the pulses being differently spaced one from another wherein intelligence is conveyed by varying spacing of the pulses while maintaining the ratio of the spacings constant.

Furthermore, in accordance with a feature of this invention the minimum spacing between the pulses is maintained at a predetermined value A or B, and the minimum spacing A plus variation in spacing X between one of the pulses and the next adjacent pulse less this spacing variation $(A+X)$ divided by the constant ratio of the pulse spacing K plus 1 is maintained at a value less than or equal to the predetermined minimum pulse spacing. This relation is expressed by the formula $$A+X-\frac{A+X}{K+1}\leq A$$

Furthermore, this given spacing A between the predetermined pulses is at all times maintained greater than or equal to the variable spacing $B+Y$, of the next adjacent pulse from said one pulse $(A\geqq B+Y)$.

In accordance with my invention this particular grouping of pulses may be utilized for conveying any desired intelligence and may be used equally well for telegraph or for voice communication purposes.

The above-mentioned and other features and objects of this invention and the manner of attaining them will become more apparent and the invention itself will be best understood by reference to the following description of an embodiment of the invention taken in conjunction with the accompanying drawings, in which Fig. 1 is a diagram illustrating the pulse spacing principles of this invention;

Figure 1:
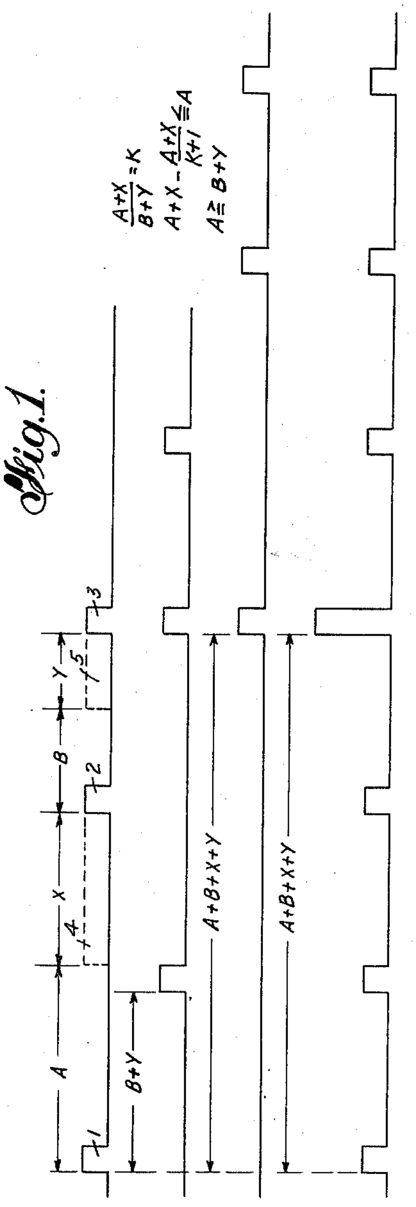

Turning first to Fig. 1, there is shown a pulse combination of three pulses arranged in accordance with the principles of my invention. The three pulses 1, 2 and 3 are shown in a position representing the maximum time spacing of the pulses, dotted lines 4 and 5 illustrates the permissible displacement of pulses 2 and 3 for the conveyance of intelligence. We may designate the minimum spacing between pulses 1 and 2 by the letter A and the space variation timing of pulse 2 by the letter X. Similarly, the minimum spacing between pulses 2 and 3 may be designated by the letter B while the time variation position of pulse 3 is represented by letter Y. With pulses having this relationship mathematical calculations may show that interference cannot be made between two sources transmitting pulses of this general spacing and ratio and that at least three sources are required to cause interference if the following conditions are observed.

(1) $$\frac{A+X}{B+Y}=K,\ \text{(a constant)}$$

(2) $$A+X-\frac{A+X}{K+1}\leq A$$

(3) $$A\geqq B+Y$$

It is clear that the relationship can be changed so that the second spacing may be the greater, that is, B may be greater than A so long as relationships of this greater spacing is maintained in accordance with Formulas 1, 2 and 3 listed above. The above provision may be useful for example in navigation systems where it is desired to challenge a particular aircraft and have it return a responding signal carrying additional information, such as for example, the altitude of the aircraft. In such a case the responding transmitter may be arranged to vary the spacing between pulses 1 and 2, and 2 and 3, while maintaining the same ratio and relationship. With such a system it would be impossible to have interference due to other craft unless three or more craft were in line for transmission of signals simultaneously. The system moreover is useful for communication purposes where it is desired to avoid interference between two or more stations operating at the same pulse spacing ratio. If more than two stations, three for example, are to be used then four pulses can be provided, the relationship being generally maintained as outlined above excepting with two different constant ratios would have to be considered and the spacing relations between pulses considered as two groups of three would be maintained as outlined above. This can be extended to 5, 6 or as many pulses as is required, the number of stations operable without interference being one less than the number of pulses of the group, although when the number of pulses used becomes excessive the receiver arrangement would be quite complex. For simplicity of illustration the explanation and the various forms of circuits shown are described for systems utilizing only three spaced pulses.

Figure 2:
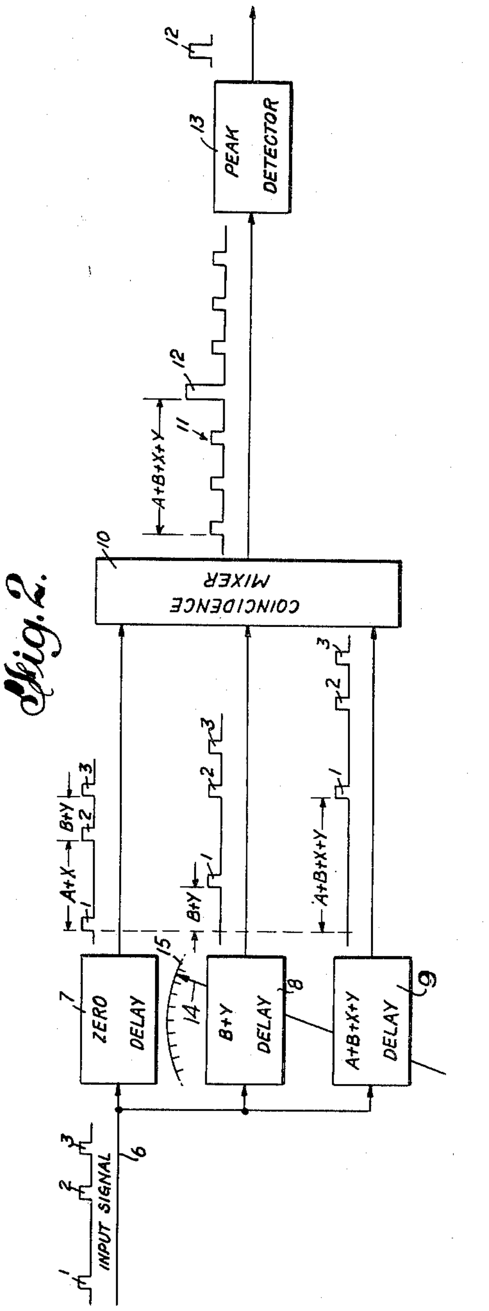
Fig. 2 is a block diagram illustrating in principle the operation of a coincidence or pulse recognition receiver circuit.

Turning now to Fig. 2, the principles upon which the receiver operates for the response of pulses is described. The incoming pulse group of pulses 1, 2 and 3 is applied over line 6 to the three separate circuits 7, 8 and 9. Circuit 7 has a zero delay so that the pulse train comes out with the same timing of pulses 1, 2 and 3 as at the input. Circuit 8 has a delay equal to $B+Y$ so that the train comes out as indicated with pulse 2 directly in time with pulse 3 at the output of circuit 7. Circuit 9 has a delay of $A+B+X+Y$ so that pulse 1 comes out coincident in time with pulses 2 and 3 out of circuit 8 and 7 respectively. These three pulse trains are applied to a combining circuit in the form of a coincidence mixer circuit 10 which may be for example a triode tube on the grid of which outputs from circuits 7, 8 and 9 are applied. It will be seen that in the output wave shown at 11 a pulse 12 corresponding to the summation of pulses 1, 2 and 3 at the point of coincidence will appear; the other pulses being of the same amplitude as the outputs of 7, 8 and 9. This output train may be applied to a peak detector or clipper circuit 13 so that pulse 12 only will be obtained at the output, this pulse corresponding to the coincidence of pulses 1, 2 and 3. It will thus be seen that a signal pulse will be provided dependent upon reception of the group of pulses with the desired spacing ratio.

While the system disclosed in Figs. 1 and 2 for selecting the desired pulse is suitable other types of delay along the various channels may be used to achieve the desired result. A specific form of delay for obtaining a constant decoding time after receipt of the first pulse of a group is to adjust one of the delay devices, for example 7 of Fig. 2, to provide a total delay of all pulses for the maximum value of $(A+X_{max}+B+Y_{max})$. The pulse may then be delayed at delay circuit 8 a value equal to $(B+X_{max}+Y_{max}-X)$ and in device 9 the delay may be adjusted to be $(Y_{max}-Y)$. This combination of delays will provide a maximum decoding time equal to $(A+X_{max}+B+Y_{max})$.

The time spacing at the transmitter may be varied in accordance with signal information. If this is, for example, the altitude of an aircraft the information may be derived at the receiver by use of an adjustable control 14 operating simultaneously on delay circuits 8 and 9 so as to vary their delay while still maintaining the same ratio of pulse spacings. Control circuit 14 may be adjusted until the output is observed from clipper 12 and the altitude or other information may then be read on a scale 15 associated with the adjustable means 14 for the delay lines.

While this system generally described in connection with Figs. 1 and 2 may be suitable for obtaining a single item of information such as altitude or other single indication the manually adjustable circuit such as shown therein would not be generally well suited for communication purposes such as commonly provided for in telegraphy.

Figures 3, 4:
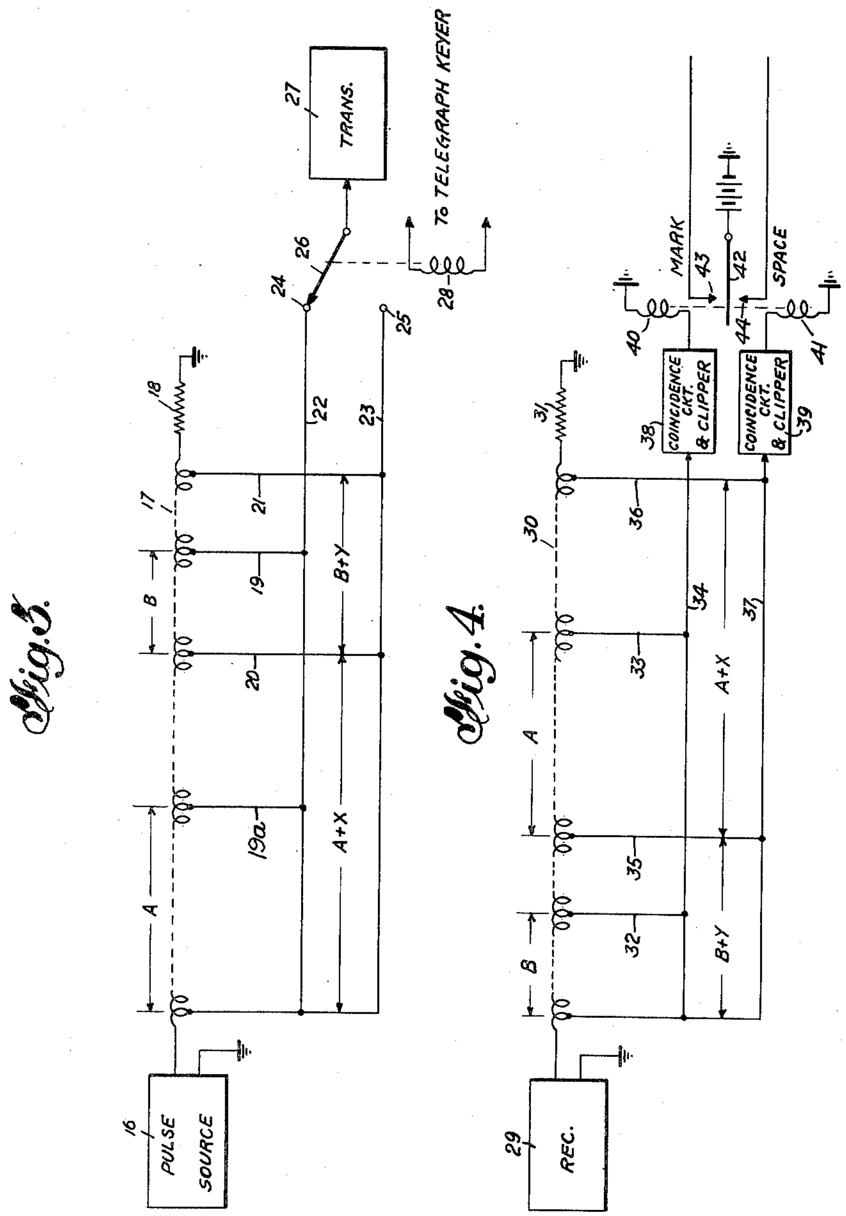
Fig. 3 is a particular example of a two-element telegraph transmitter incorporating the principle of my invention.
Fig. 4 is a two-element telegraph receiver usable with the circuit of Fig. 3.

Turning to Fig. 3, a telegraph transmitter arrangement suitable for use in accordance with the principles of my invention is shown. In this arrangement there is provided a pulse source 16 the output of which may be applied to a delay line 17 terminating in a suitable resistor 18 to avoid reflection of pulses applied thereto. Along delay line 17 are provided two sets of tap lines 19, 19a and 20, 21. Taps 19, 19a are connected to apply pulses with a given delay spacing to one line 22 and taps 20, 21 provided with a different spacing but preserving the same ratio as the time spacing above and are coupled to a second line 23. Pulses without delay are supplied from source 16 to both of lines 22 and 23. A switching circuit for switching between both lines is provided as follows. Switch terminals 24 and 25 are arranged at the ends of lines 22, 23 respectively and are adapted to be connected by a switch arm 26 alternatively to a transmitter 27. Switch 26 may be operated by a coil 28 connected to a telegraph keyer so that switch arm 26 will transmit pulse combinations in accordance with those set up on lines 22 and 23 respectively. These may for example be the mark and space pulses of a telegraph code.

The pulses transmitted from a transmitter such as shown in Fig. 3 may be received on a receiver such as shown in Fig. 4. In this figure the pulse receiver itself is illustrated at 29 the output of which is coupled to a delay line 30, terminated by a resistor 31, which may be similar in all respects to delay line 17 and terminating resistor 18. A first pair of taps 32, 33 is coupled to a first receiver line 34 and a second pair of taps 35, 36 is connected to a receiver line 37. Also the output of receiver 29 is applied without delay to each of lines 34 and 37. The spacing of taps 32 and 33, and 35 and 36 are arranged similarly to delay circuits 8 and 9 of Fig. 2 so that in the respective coincidence circuits 38 and 39 output pulses will be obtained for the pulse groups having the particular spacing corresponding to taps 32 and 33, 35 and 36 respectively. These spacings are made in accordance with the principles described in detail in connection with Fig. 2 so that output pulses may be derived for the groups of pulses properly spaced at these respective coincidence circuits. The output pulses may be applied to alternative windings 40, 41 of a double throw relay comprising armature 42 in contacts 43, 44 corresponding to the normal mark and space contacts of a telegraph relay receiver. It will thus be seen that a telegraph system incorporating the principles of this invention and free from the problems of interference is provided.

Figure 5:
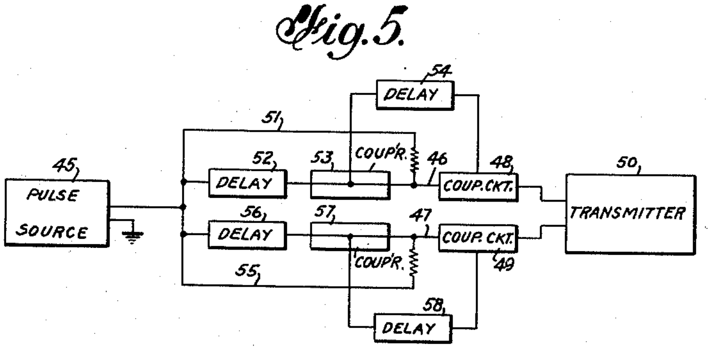
Fig. 5 is a modified form of telegraph transmitter of the type particularly shown in Fig. 3.

While in the circuit of Figs. 3 and 4 I have shown a common delay line for providing the various pulse spacing it is clear that if desired the individual delay devices could be used instead. In Fig. 5 is illustrated an arrangement utilizing such separate delay devices. In this figure a pulse source 45 is provided which applies pulses from its output separately to lines 46 and 47 through coupling circuits 48, 49 to a telegraph transmitter 50 which may be similar to that shown by switch elements 24—28 of Fig. 3. The output pulses are applied over lines 51, delay device 52, coupler 53, delay device 54 and coupler 48 to telegraph transmitter 50 for one pulse combination. For the other pulse combination the pulses are applied over line 55 and from delay device 56 and coupler 57, and delay device 58 and coupler 49 to the telegraph transmitter 50. It will be clear that the delay devices of Fig. 5 may constitute separate delay lines or other forms of delay apparatus such as multivibrator type of trigger circuits wherein rectangular waves may be obtained which are differentiated to reproduce the desired pulse shape.

Figure 6:
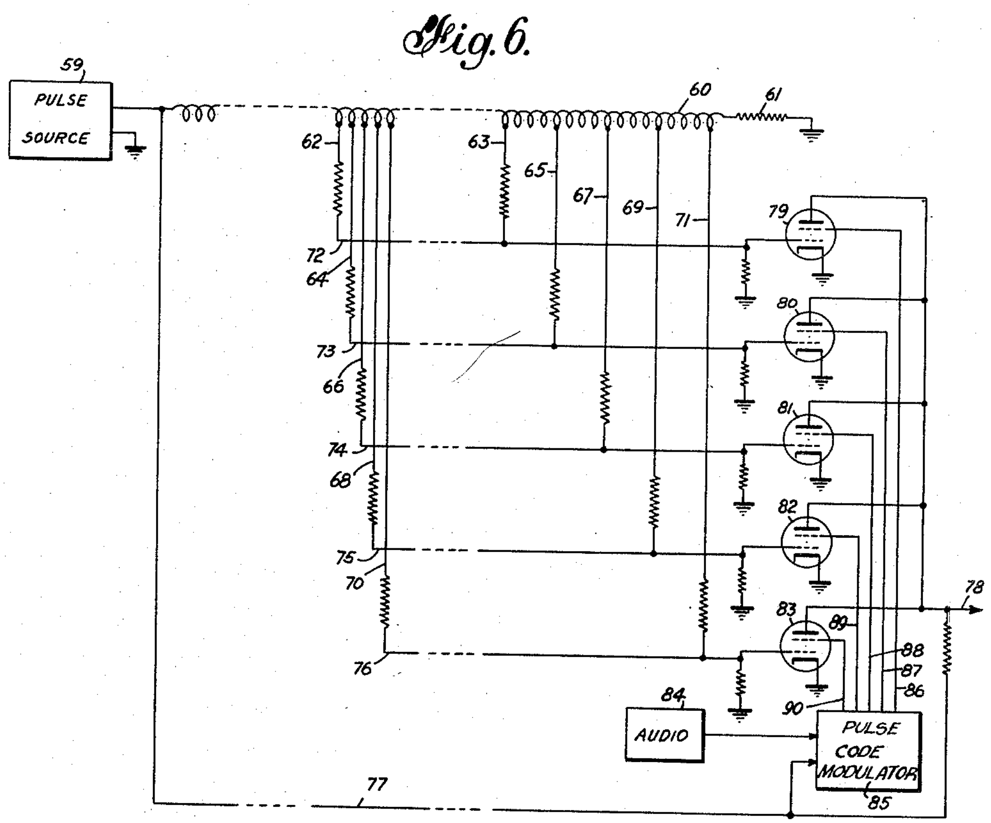
Fig. 6 is an illustrated example of a transmitter in accordance with this invention utilizing the principles of pulse code modulation.

In Figs. 3–5 two element telegraph systems have been disclosed. In Fig. 6 is illustrated an arrangement for pulse code transmission wherein the principles of my invention may be appiled for designating the different pulse code elements at the output of a pulse code modulator by three or more pulses to avoid the dangers of interference. In this arrangement there is provided a pulse source 59 the output of which may be coupled to a delay line 60 terminated in a resistor 61 as described above in accordance with Fig. 3. Here again two separate taps are provided for each of the code elements to be used, in the particular illustration a five-element code being indicated of the type in which the five elements are simultaneously presented. Thus there are provided separate lines 62, 63, 64, 65, 66, 67, 68, 69 and 70, 71 coupled to separate coding lines 72, 73, 74, 75 and 76. Output pulses from 59 may be applied without delay over line 77 to the final output line 78. This arrangement is preferred over applying these pulses separately to line 72—76 since it is desirable to have the undelayed pulse which is common to all of the code combinations of the same amplitude as the other pulses. Since two or more of lines 72—76 may be used simultaneously the initial pulse would tend to be of greater amplitude in the output circuit were the undelayed pulse applied thereto.

Lines 72—76 are each coupled to respective gating tubes 79, 80, 81, 82 and 83 but these tubes are normally biased so that they will not pass energy except when a gating pulse is applied thereto. Energy from an audio source 84 is applied to a pulse code modulation device 85, producing simultaneously pulses in combination corresponding to a predetermined code. Examples of such a coder are described in U. S. Patent No. 2,272,070 to A. H. Reeves for "Electric Signalling System" granted February 3, 1942 and U. S. Patent No. 2,453,461 to J. C. Shelleng for "Code Modulation Communication System" granted November 9, 1948. These coded pulses are simultaneously applied over separate lines 86, 87, 88, 89, 90 to the respective tubes 79—83. It will be understood that the PCM pulses from 85 are of a duration sufficient to encompass the total delay of delay line 60. Thus the particular pulse coding combination will release to line 78 signals from such of tubes 79—83 as correspond to the particular code combination of groups of pulses. In order that the release of these pulses be properly timed with respect to the pulses from source 59 it is desirable that a synchronizing signal be applied to the pulse code modulator from pulse source 59 as indicated over the line 77.

Figure 7:
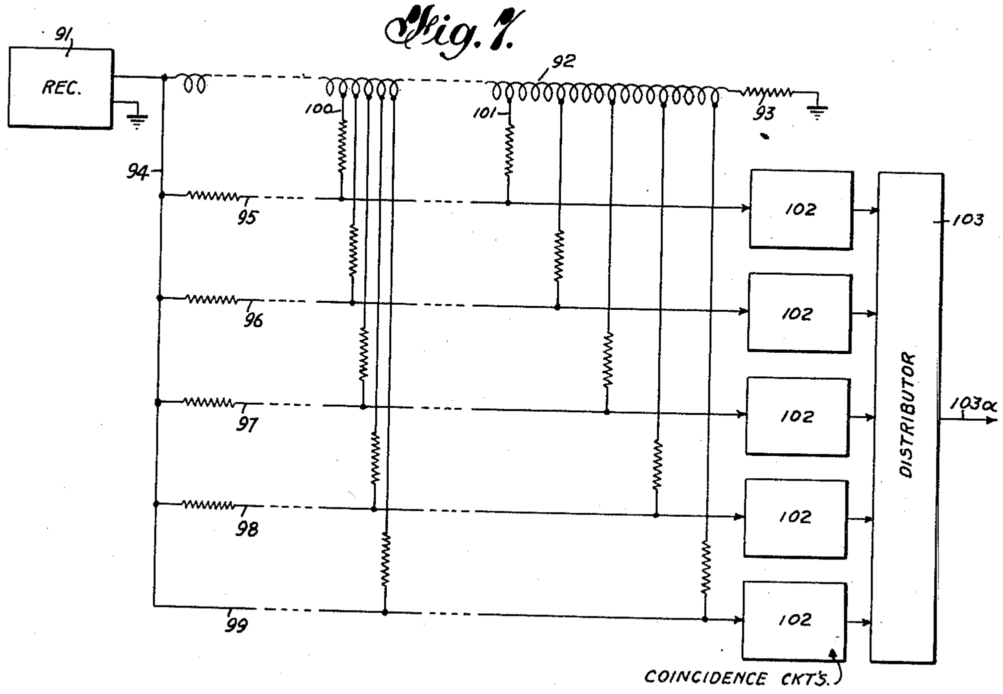
Fig. 7 is a receiver for receiving signals transmitted over a system such as shown in Fig. 6.

In Fig. 7 is shown a receiver arrangement which may be used in conjunction with the transmitter of Fig. 6. The various pulse code combinations received in a receiver 91 are applied over delay line 92 terminating in resistor 93 and over a separate line 94 to individual output lines 95, 96, 97, 98 and 99. In line 95 the pulses are applied over tapping lines 100 and 101 in accordance with the principles described in connection with Fig. 2 so that the energy will appear in clipper selector circuit 102 if a pulse combination with the desired spacing is present. Similarly, energy is applied over corresponding tap connections to each of separate lines 96—99 and to corresponding clipper selector circuits. These selector circuits are coupled to a distributor 103 and the output of which may be applied over line **103*a* to any conventional pulse code demodulator circuit such as those described in the above-mentioned U. S. Patent Nos. 2,272,070 and 2,453,461. It will be understood from the foregoing description that the various combinations will appear in the outputs of lines 95—99** in accordance with the particular code combination received so that only if the proper ratio is preserved will the circuit be operative to select the given signal.

Figure 8:
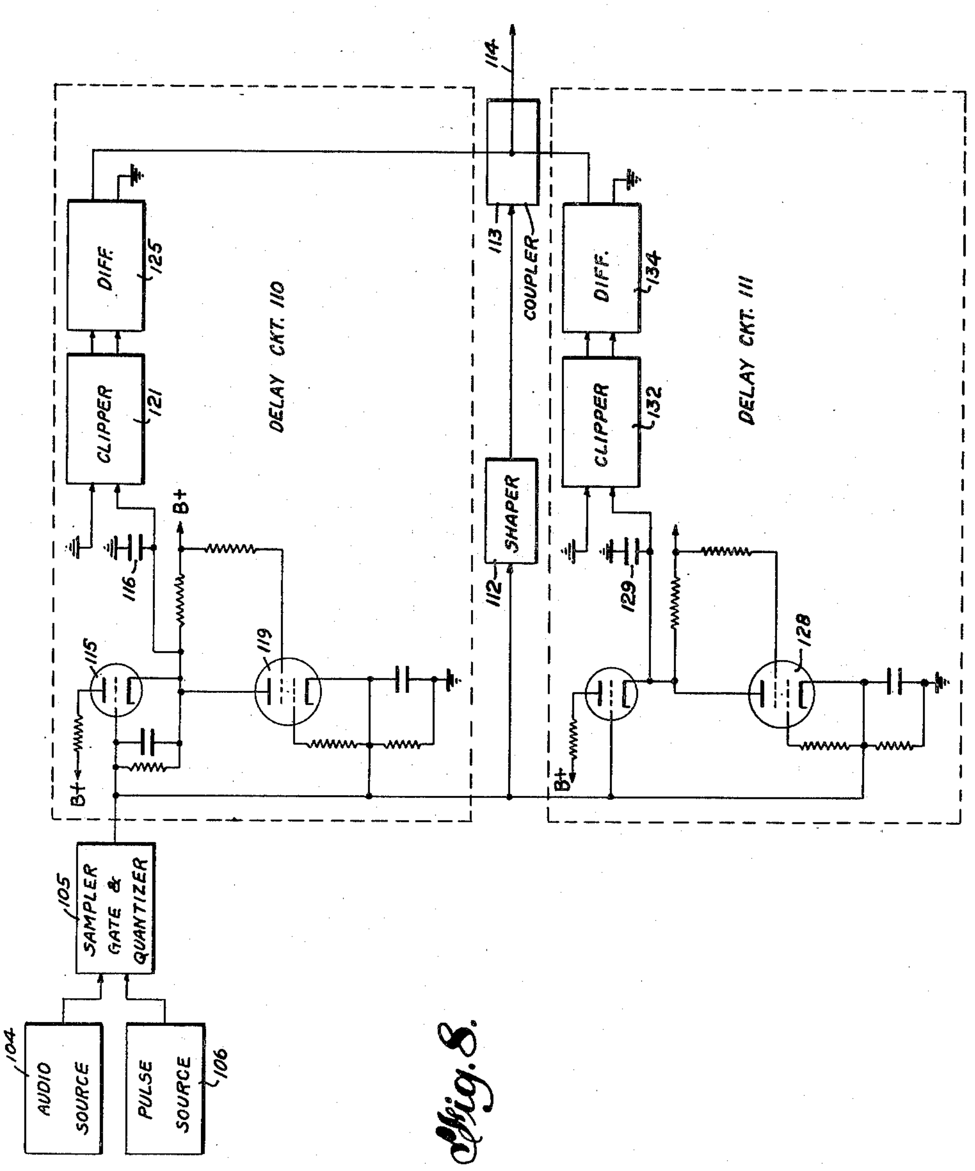
Fig. 8 is a modified form of this invention illustrating the application of a circuit arrangement for transmitting amplitude modulated signals.

In Fig. 8 is disclosed an arrangement for transmitting directly audio signals corresponding to various amplitude levels by the use of electronically controlled means instead of delay line methods. In this arrangement a source of audio or other intelligence signals is indicated at 104. This energy is applied to sampler gate and quantizer circuit 105. Simultaneously with the application of the audio signals gating signals are applied from pulse source 106 to the sampler gate and quantizer circuit 105. Thus in the output of circuit 105 are provided pulses varying in amplitude in given steps corresponding to the input audio signal. Preferably quantizer circuit 105 will have a given number $n$ of amplitude levels for example 64 which is sufficient to convey the intelligence to be transmitted without undue distortion. Such quantizer circuits are known in pulse code modulation systems and so are not described in detail herein.

Figure 9:
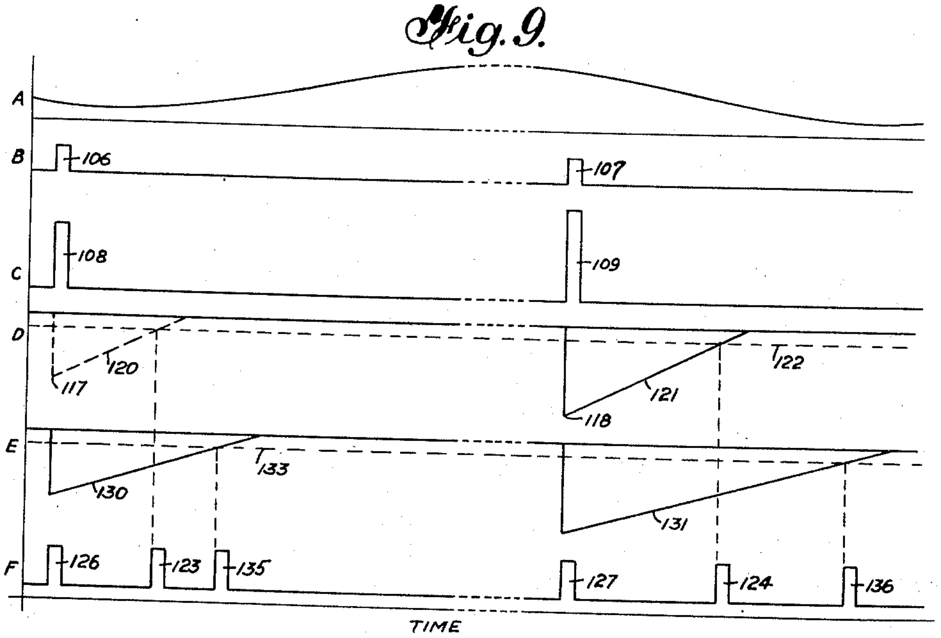
Fig. 9 is a set of graphs used in illustrating the operation of the circuit of Fig. 8.

The voice or audio input may be represented by graph A of Fig. 9 while the gating pulses are represented in graph B at 106, 107 and the quantized output pulses from sampler gate 105 are shown in graph C as pulses 108, 109. These pulses are applied to separate circuits 110, 111 to secure the desired pulse spacing and are also applied without delay over a suitable shaper 112 to a common output coupler 113 which will apply the signals to output line 114. Circuit 110 may comprise a tube 115 which is maintained normally blocked and is coupled in series as the charging circuit for a condenser 116. This energy from sampler gate 105 is applied to the grid of 115 rendering the tube conductive so that condenser 116 assumes a charge corresponding to the amplitude of the input pulse as shown in graph D at 117, 118. Simultaneously with the application of the pulse of tube 115 the pulse is applied to a resistance tube 119 to block this tube from conduction. As soon as the pulse is passed however tube 119 again becomes conductive and condenser 116 discharges through the tube producing linear portions of the discharge voltage 120, 121 shown in Fig. 9, graph D. The constants of the tube circuit 119 are so adjusted that a constant discharge rate will be maintained. The output pulses from condenser 116 are clipped in clipper 121 at a given clipping level indicated at 122 in graph D. These clipped waves are applied to pulse producing differentiator circuit 125, arranged so that a pulse will be produced when the voltage 117 reaches level 122 thus producing output pulses 123, 124 shown in graph F, Fig. 9. It will be noted by reference to graph F that the pulses 123 and 124 are differently spaced from the equally timed pulses 126, 127 which represent the undelayed pulses applied through shaper 112 and coupler 113 applied to line 114. The circuit 111 is substantially the same as circuit 110 except that here the condenser discharge tube 128 is proportioned so as to cause the storage condenser 129 to discharge at a different rate. The charge and dicharge of this condenser is represented by the saw-tooth waves 130, 131 of graph E of Fig. 9 in which the clipper 132 operates at a clipping level indicated at 133 graph E so that the pulses produced at 134 take positions indicated at 135, 136 of graph F thus for the particular amplitude level shown at 108 the pulse grouping 126, 123, 135 is provided while at a different amplitude level 109 the pulse grouping 127, 124, 136 is provided. For each of the different discrete amplitude levels in the output of sampler quantizer 105 different spacing of the pulses will be provided but because of the constant slope characteristics of the circuits of Fig. 8, the ratio of the spacing will be preserved constant.

Figure 10:
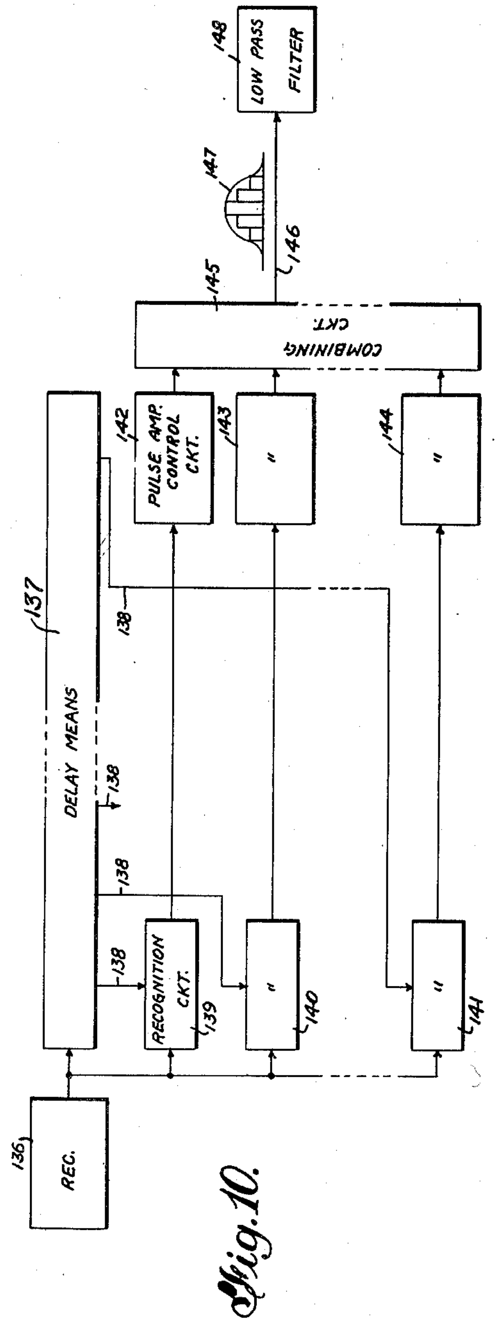
Fig. 10 is a block diagram circuit of a form of receiver for use with the system of Fig. 8

Turning now to Fig. 10, a receiver for operation with a transmitter such as shown in Fig. 8 is provided. In this receiver the pulses are detected in the receiver portion 136 if they have been transmitted by carrier wave and may be applied to a delay means 137. A plurality of different tapping cables 138 may be provided each having two tapping points in delay means 137 to correspond with the multiple delays for each of the separate discrete amplitude levels of the signal. This delay means may for example be similar in construction to that shown in Fig. 7. Pulses from this delay means and also from the receiver 136 without delay are applied to separate recognition circuits 139, 140 and 141 representing the various amplitude levels from $1-n$ depending upon the number of discrete amplitude levels present in the signals. These recognition circuits each incorporate coincidence circuits of the type described in connection with previous receiver arrangements. The pulses from these recognition circuits are separately applied to different pulse amplitude control circuits 142, 143, 144 each being arranged to supply a pulse of an amplitude corresponding to the particular level in question. The pulses for producing these different amplitude selections will be sequentially received at the receiver so that output pulses from the separate pulse amplitude circuits 142—144 will sequentially be produced. These output pulses are applied to a combined circuit 145 so that in the output line 146 therefrom there will be produced a series of pulses different in amplitude as indicated at 147. This series of pulses may then be applied to low pass filter 148 which will serve to smooth out wave 147 to reproduce the audio signal. It will be clear that the pulse amplitude circuits 142, 143, 144 may if desired be sources of potential of different discrete amplitudes which are gated in response to pulses from their respective recognition circuits so that a voltage of the predetermined selected amplitude will be applied to the combining circuit 145.

Figure 11:
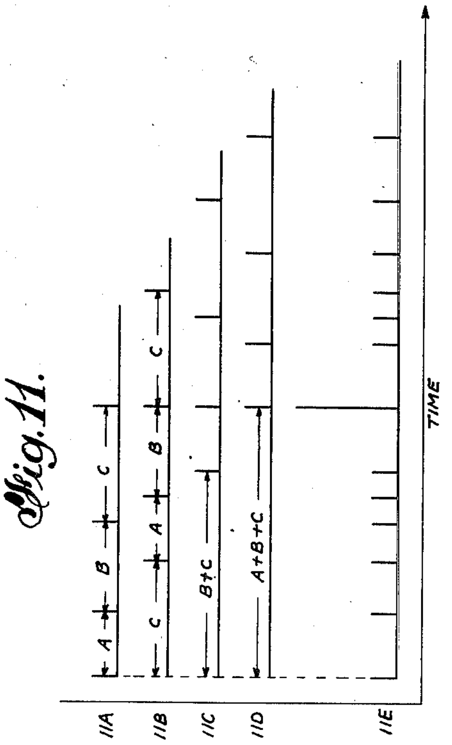
Fig. 11 is a graphical representation showing the selection of a group of four pulses in accordance with this invention.

Although the invention has been described as applied to a few simple circuits of particular form, it will be clear that many modifications thereof will occur to those skilled in the art. Furthermore, although the description has been limited to specific circuits utilizing only combinations of three pulses the principles of my invention apply equally well to pulse groupings of higher numbers than three. In Fig. 11 is shown a set of graphs illustrating how higher numbers of pulses will combine to produce the desired results. In graph 11A is shown a group of four pulses separated by intervals A, B, and C. In 11B the group of pulses is shown delayed by interval C, in 11C delayed by interval $B+C$, and in 11D delayed by interval $A+B+C$. When the pulses are combined they produce the resultant group shown in graph 11E wherein a single summation of all the pulses occurs as shown. From this it is seen that given any number of unequally spaced pulses selection may be made by combining the undelayed pulse group with the pulse group delayed by the time interval between the last two pulses, and the summation of the successive preceding time intervals.

While I have described above the principles of my invention in connection with specific apparatus, it is to be clearly understood that this description is made only by way of example and not as a limitation to the scope of my invention.

What I claim is:

1. A signalling system comprising means for producing groups of at least three pulses such that the ratio of the pulse spacing of adjacent pulses is constant, a source of signal intelligence and means responsive to said signal intelligence for altering the spacing between pulses of successive groups in accordance with said signal intelligence while always maintaining said ratio constant.

2. A system according to claim 1 wherein at the minimum spacing of the pulses of each group the spacing between the first and second pulses is equal to or greater than the spacing between the second and third pulses.

3. A system according to claim 2, wherein the said spacing between the first and second pulses minus this said spacing divided by the constant ratio minus one is not greater than equal quality with the minimum of said spacing.

4. A signalling system comprising means to provide a combination of at least three pulses the spacings, A and B, between adjacent pulses having a given ratio, K, signalling means, and means responsive to said signalling means to vary the spacing between said pulses by given amount X and Y under control of said signalling means while always maintaining said ratio constant.

5. A system according to claim 4 wherein said means to provide said pulses produces three pulses in which the time interval between two adjacent pulses, $B+Y$, is at least equal to the time interval between the other adjacent pulses at their minimum spacing, A, and in which the time interval between the first and second pulses, $A+X$, minus this time interval, $A+X$, divided by said given ratio plus one, $K+1$, is at least equal to the said minimum spacing, A.

6. A signalling system comprising means to provide a combination of at least three pulses the spacings, A and B, between adjacent pulses having a given ratio, K, signalling means, and means to vary the spacing between said pulses by given amount X and Y under control of said signalling means while maintaining said ratio constant, said first named means comprising a pulse source, delay means for producing successively different delays of pulses from said source, and combining circuits to combine pulses from said source and successively delayed pulses.

7. A signalling system comprising means to provide a combination of at least three pulses the spacings, A and B, between adjacent pulses having a given ratio, K, signalling means, and means to vary the spacing between said pulses by given amount X and Y under control of said signalling means while maintaining said ratio constant, said first named means comprising a pulse source, delay means for producing successively different delays of pulses from said source, and combining circuits to combine pulses from said source and successively delayed pulses, two of said delay means and combining circuits being provided, and said means to vary comprises a switching circuit under control of said signalling means for coupling said two delay means selectively to different of said combining circuits.

8. A signalling system comprising means to provide a combination of at least three pulses the spacings, A and B, between adjacent pulses having a given ratio, K, signalling means, means to vary the spacing between said pulses by given amount X and Y under control of said signalling means while maintaining said ratio constant, and a receiver for said combination of pulses, comprising a plurality of delay circuits equal to one less than the number of pulses in said combination of pulses, said delay circuits producing respective delays corresponding to the interval between the last two pulses, and the successive summation of interval between the last pulse of said combination of pulses and successively preceding pulses, means coupled to said delay circuits to cause simultaneous variation of their respective delays for coincidence with the pulse spacing of said combination of pulses while maintaining said given ratio constant, and a combining circuit for combining the undelayed combination of pulses and the pulse combination from said delay circuits.

9. A communication system comprising a pulse source, a plurality of delay circuits coupled to said pulse source for producing pulse delays of different values for pulses from said source, means for combining undelayed pulses from said source and delayed pulses from said delay circuits to provide groups of pulses having different time spacings providing a predetermined ratio of the time spacing between successive pulses of said group, a signal source and transmitter means responsive to energy from said signal source to effectively vary the delays of said delay circuits proportionally to alter the spacing of said pulses while preserving the ratio between pulses of said groups constant.

10. A communication system according to claim 9, wherein said delay circuits comprise separate energy storage circuits coupled to said pulse source for storing energy proportional to the amplitude of pulses applied from said source, means for discharging said storage circuits at different constant rates, and means responsive to discharge of said storage circuits to a predetermined level for producing effectively delayed pulses, and said transmitter means comprises means for varying the amplitude of pulses from said source in accordance with the signal amplitude.

11. A communication system according to claim 9 further comprising a receiver for receiving the transmitted pulse groups having varying pulse spacing and constant ratio of time spacing between pulses of the pulse groups, a plurality of receiver delay circuits coupled to said receiver having respective delays equal to the time spacing between the last pulse of each pulse group and each of the other pulses of said group, a combining circuit for combining the received pulse group and the delayed pulse groups from each of said delay circuits and an amplitude selector circuit for selecting from said combined pulse groups the resultant pulse of greatest amplitude, said receiver delay circuits comprising a plurality of groups of separate delay circuits, combining circuits and amplitude selector circuits responsive respectively to pulse groups of different spacings, and further comprising signal reproducing means for reproducing the wanted signals from said received pulse groups.

12. A communication system comprising a pulse source, a plurality of delay circuits coupled to said pulse source for producing pulse delays of different values for pulses from said source, means for combining undelayed pulses from said source and delayed pulses from said delay circuits to provide groups of pulses having different time spacings providing a predetermined ratio of the time spacing between successive pulses of said group, a signal source and transmitter means responsive to energy from said signal source to effectively vary the delays of said delay circuits proportionally to alter the spacing of said pulses while preserving the ratio between pulses of said groups constant, said delay circuits comprising a plurality of delay circuit and combining means groups, each delay circuit group connected to provide individual groups of more than three pulses having a different spacing of said predetermined ratio, and said transmitter means comprises coupling means responsive to said signals for selectively coupling said combining means for effective operation.

13. A communication system according to claim 12, wherein said coupling means comprise separate normally blocked gate circuits, said signal source providing gating control energy selectively to release said gating circuits.

14. A communication system according to claim 13, wherein said means is provided to apply said gating control energy to said gating circuits in predetermined code combinations.

15. A receiver responsive to groups of a plurality of differently spaced pulses representing a predetermined signal, said pulses having a predetermined pulse spacing ratio between pulses of each group comprising a receiver for receiving transmitted pulse groups, a plurality of delay circuits coupled to said receiver having respective delays equal to the time spacing between the last pulse of each pulse group and each of the other pulses of said group, a combining circuit for combining the received pulse group and the delayed pulse groups from each of said delay circuits and an amplitude selector circuit for selecting from said combined pulse groups the resultant pulse of greatest amplitude, said receiver delay circuits comprising a plurality of groups of separate delay circuits, combining circuits and amplitude selector circuits responsive respectively to pulse groups of different spacings, and further comprising signal reproducing means for reproducing the wanted signals from said received pulse groups.

References Cited in the file of this patent

UNITED STATES PATENTS

| | | |
|---|---|---|
| 1,695,908 | White et al. | Dec. 18, 1928 |
| 1,976,548 | Field | Oct. 9, 1934 |
| 2,329,234 | Willis | Sept. 14, 1943 |
| 2,444,741 | Loughlin | July 6, 1948 |
| 2,482,544 | Jacobsen | Sept. 20, 1949 |
| 2,499,225 | Marshall | Feb. 28, 1950 |
| 2,706,810 | Jacobsen | Apr. 19, 1955 |